United States Patent [19]

Tsuchiya et al.

[11] Patent Number: 4,727,976
[45] Date of Patent: Mar. 1, 1988

[54] WORKPIECE CONVEYOR

[75] Inventors: Hiroshi Tsuchiya; Satoshi Komaki; Taminori Yanagisawa; Masami Sano, all of Toyota, Japan

[73] Assignees: Toyota Jidosha Kabushiki Kaisha; Taiho Seiki Kabushiki Kaisha, both of Toyota, Japan

[21] Appl. No.: 895,230

[22] Filed: Aug. 11, 1986

[51] Int. Cl.⁴ ................. B65G 47/24; B65G 25/00
[52] U.S. Cl. ........................... 198/403; 198/468.6; 198/774; 72/422
[58] Field of Search ............. 198/339.1, 403, 404, 198/468.2, 468.6, 774, 614; 414/222, 223, 225, 226, 750, 751, 753, 771, 779, 783; 72/422

[56] References Cited

U.S. PATENT DOCUMENTS

| | | | |
|---|---|---|---|
| 3,391,802 | 7/1968 | Austin | 414/783 |
| 4,249,440 | 2/1981 | Feuillade | 198/403 |
| 4,279,561 | 7/1981 | Schneider et al. | 414/753 |
| 4,523,670 | 6/1985 | Yanagisawa et al. | 198/403 |

FOREIGN PATENT DOCUMENTS

| | | | |
|---|---|---|---|
| 58-14763 | 1/1983 | Japan . | |
| 41630 | 3/1983 | Japan | 72/422 |
| 58-134233 | 8/1983 | Japan . | |
| 58-147636 | 10/1983 | Japan . | |

Primary Examiner—Joseph E. Valenza
Attorney, Agent, or Firm—Oblon, Fisher, Spivak, McClelland & Maier

[57] ABSTRACT

A workpiece conveyor for conveying a workpiece between presses is disclosed. The workpiece conveyor includes first, second and third stations disposed between the presses, a reversing mechanism disposed at the first station and equipped with a pair of right and left reversing jaws that are driven separately for elevation and rotation, a first workpiece receiver disposed at the second station and capable of moving up and down, an unloader mechanism and a second workpiece receiver disposed on an unloader which is disposed at one of the end portions of a carriage capable of moving between the first to third stations, a third workpiece receiver disposed at the other end of the carriage which is spaced apart from the second workpiece receiver by the same distance as the distance between the stations, and leaf cams disposed near the first station in such a manner as to be capable of meshing with the unloader lifter and removing along an arcuate or curved path the workpiece.

3 Claims, 6 Drawing Figures

WORKPIECE CONVEYOR

BACKGROUND OF THE INVENTION

1. Field of the Invention

This invention relates to a workpiece conveyor for conveying a workpiece between presses, and more particularly to a workpiece conveyor which is equipped with a 180° reversing mechanism for a workpiece and can feed the workpiece at a constant pitch.

2. Description of the Prior Art

One example of conventional workpiece conveyors is disclosed in Japanese Utility Model Laid-Open No. 147636/1973 and one example of apparatuses for reversing a workpiece by 180° is disclosed in "Work Transferring Apparatus" of Japanese Utility Model Laid-Open No. 134233/1983.

The workpiece conveyor disclosed in the first reference, i.e. Japanese Utility Model Laid-Open No. 147636/1973 has a construction wherein a carriage equipped with a workpiece receiver is slidably mounted to a carriage guide and reciprocatingly moved by means of a crank and a link mechanism. This conveyor provides the advantages that a stroke which is four times the crank radius can be obtained and the apparatus can be made compact as a whole. On the other hand, the apparatus disclosed in the second reference, i.e. Japanese Utlity Model Laid-Open No. 134233/1983, has a construction wherein a slide guide is disposed between a pair of upper and lower sprockets and a workpiece clamping device is bridged between a chain wound on the sprockets and a slider fitted to the slide guide so that the slider is raised in such a manner as to follow up the rotation of the chain and the workpiece clamping device is reversed by 180° near the raised end of the slider. This apparatus has the advantage that it can be used for both replacement operation and non-replacement operation.

It has been customary in the art to incorporate a so-called "workpiece conveyor" and a reversing mechanism between two presses. If these two apparatuses are incorporated, it becomes necessary to dispose the workpiece conveyors disclosed in Japanese Utility Model Laid-Open No. 147636/1973 at a first station on a press side of a preceding step and at a third station on a press side of a subsequent step and to dispose the workpiece transferring apparatus of Japanese Utility Model Laid-Open No. 134233/1983 at an intermediate second station. In this case, an arm type unloader is disposed on the press side of the preceding step and an arm type loader, on the press side of the subsequent step.

In the workpiece conveyor of the kind described above between a series of presses, however, the workpiece transferring apparatus greatly projects upward and the arms of the loader and unloader interfere with the workpiece transferring apparatus, resulting in the problem that the dimension of the workpiece must be limited or the pitch between the presses must be increased. In such a case, application to existing presses having a small pitch is impossible and the advantages of the workpiece conveyor cannot be fully utilized.

The interference between the arm of the loader-unloader and the workpiece transferring apparatus can be avoided by, for example, providing the carriage with the unloader function. However, unless the unloader has a good timing with replacement operation of the workpiece, the cycle time will be extended uselessly and unless sufficient consideration is paid to arrange the workpiece take-out cycle by the unloader mechanism, strain is likely to occur in the workpiece.

On the other hand, the workpiece transferring apparatus described above is of such a type wherein the workpiece is drastically reversed near the raised end of the slider. Accordingly, if the workpiece is great in size and has low rigidity, strain is likely to occur in the workpiece due to winding pressure, impact at the start and stopping steps, and so forth. Since the transverse width of the workpiece transferring apparatus is fixed so as to correspond to a maximum workpiece, the reversing clamp arm must be elongated to handle a small workpiece, whereby a load increase occurs and durability is decreased, eventually.

Besides the workpiece transferring apparatus described above, the reversing mechanisms include a windmill type, a rack-pinion type, and so forth, but all of them are complicated in construction and cannot easily cope with various shapes and sizes of workpieces.

SUMMARY OF THE INVENTION

In order to eliminate the problems of the prior art described above, the present invention provides a workpiece conveyor having a construction in which a reversing mechanism having a pair of right and left reversing jaws, which are separately driven for elevation and rotation, is disposed at a first rotation, a first workpiece receiver is disposed in an elevated position at a second station, an unloader lifter and a workpiece receiving lifter are disposed adjacent each other at one of the end portions of a carriage, which is disposed movably between the first station to a third station, an unloader mechanism and a second workpiece receiver are disposed on the unloader lifter and the workpiece receiving lifter, respectively, a third workpiece receiver is disposed at the other end portion of the carriage which is spaced apart by the same distance as the distance from the second workpiece receiver to the station, and leaf cams which mesh with the unloader lifter and which are capable of a curved or arcuate path removal of the workpiece are disposed near the first station.

In the workpiece conveyor having the construction described above, the unloader mechanism mounted to the carriage first clamps the workpiece inside a press mold, and then the carriage moves forth while elevating the unloader lift. The unloader lifter rises while describing a curve in accordance with the R shape of the leaf cams so that the workpiece can be smoothly removed and charged to the first station, where the workpiece is delivered to the reversing jaw inside the reversing mechanism. The reversing jaw gradually rotates in its one cycle of ascension and descension, reverses the workpiece and places it onto the second workpiece receiver on the carriage that has returned to its original position. At the time of completion of transfer, the unloader mechanism on the carriaqe has already clamped the next workpiece, and the workpiece on the second workpiece receiver is transferred to the first workpiece receiver inside the second station due to the subsequent advance of the carriage. While the carriage is moving so as to repeat the operation described above, the workpiece is transferred from the first workpiece receiver to the third workpiece receiver on the carriage and then from the third station to the loader. Since the unloader lift has a shape in conformity with the R-shaped profile of the leaf cam, the workpiece can be smoothly removed from the press.

Because the carriage is provided with the unloader function as described above, the reversing mechanism can be fitted to the first station, and the replacement operation and feeding of the workpiece at a constant pitch become possible even in existing presses having a limited space between them. Since the removal cycle of the workpiece by the unloader mechanism is smooth and since the reverse operation cycle on the workpiece by the reversing jaw is also smooth, it becomes possible to restrict the occurrence of strain on the workpiece and to reduce the cycle time by the operation of the two workpiece receivers on the carriage, which receivers move up and down independently of each other, with well balanced timing.

In accordance with the workpiece conveyor of the present invention described above, the reversing mechanism is disposed at the first station on the workpiece removal side, and the unloader mechanism and the two independent workpiece receivers are mounted to the carriage that moves between the stations. Accordingly, the workpiece can be efficiently fed at a constant pitch with or without reversion even in the small space existing with small presses. Since one set of the unloader of an arm type becomes unnecessary, the system construction can be greatly simplified.

Since the present invention can smoothly remove the workpieces by the unloader mechanism and can smoothly reverse movement of the workpieces by the reversing mechanism, such can restrict the strain that will otherwise develop in the workpieces.

Furthermore, the cycle time can be reduced by the operation of the two workpiece receivers on the carriage that move up and down independently of each other, with good timing.

In conjunction with the reversing mechanism, its transverse width can be regulated. Therefore, the constituent elements can be made small in size and light in weight so that the exchange of jigs can be made easily and the durability thereof can be improved by the reduction of load. Furthermore, the kinds of workpieces that can be dealt with by the workpiece conveyor can be expanded.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Hereinafter, one embodiment of the present invention will be described with reference to the accompanying drawings.

Figure 1:
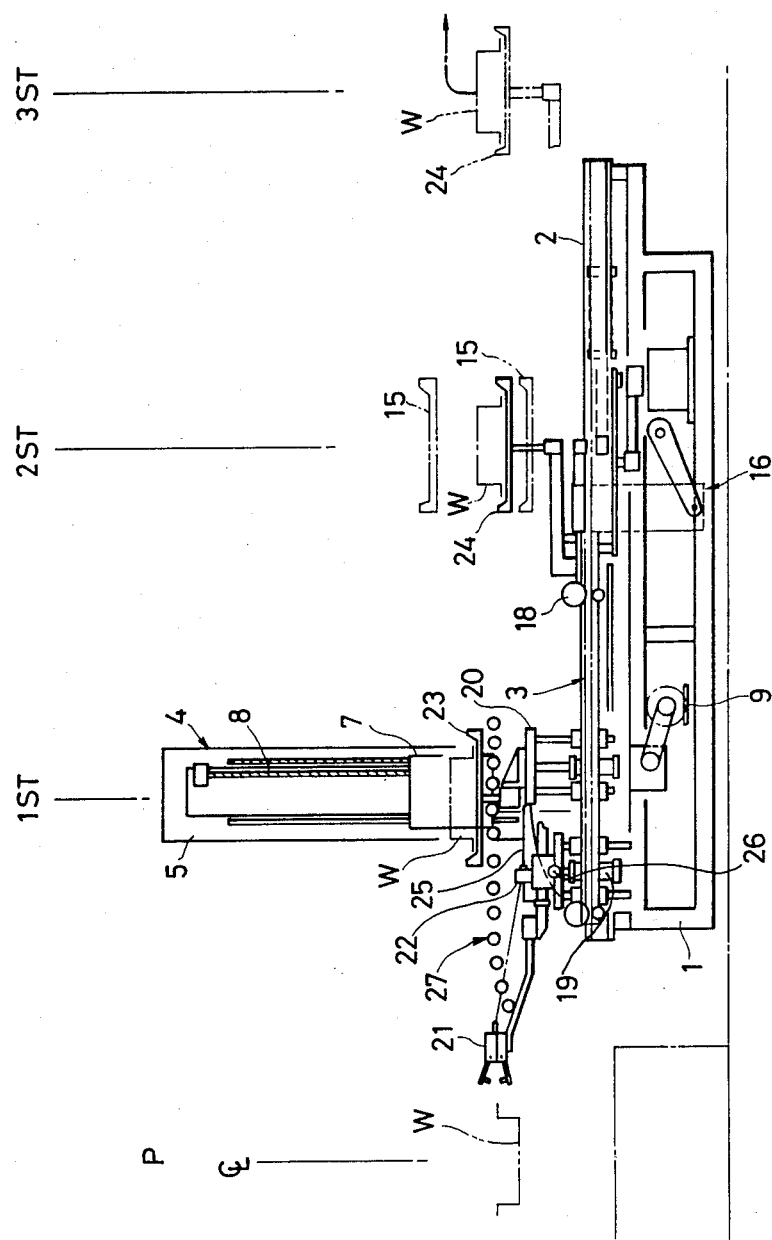
FIG. 1 is a front view showing the overall construction of a workpiece conveyor in accordance with the present invention.

FIG. 1 shows the overall construction of the workpiece conveyor in accordance with the present invention. The workpiece conveyor of this invention is disposed between a press P of a preceding step and a press of a next step (not shown). Such includes three stations serving as relay stations of work transfer, i.e. first, second and third stations 1ST, 2ST and 3ST, that are respectively disposed with an equidistant pitch. An elongated bed 1 is disposed in such a manner as to extend from the first station 1ST to the third station 3ST, and a carriage 3 capable of moving along guide rails 2 is disposed on the bed 1.

Figure 2:
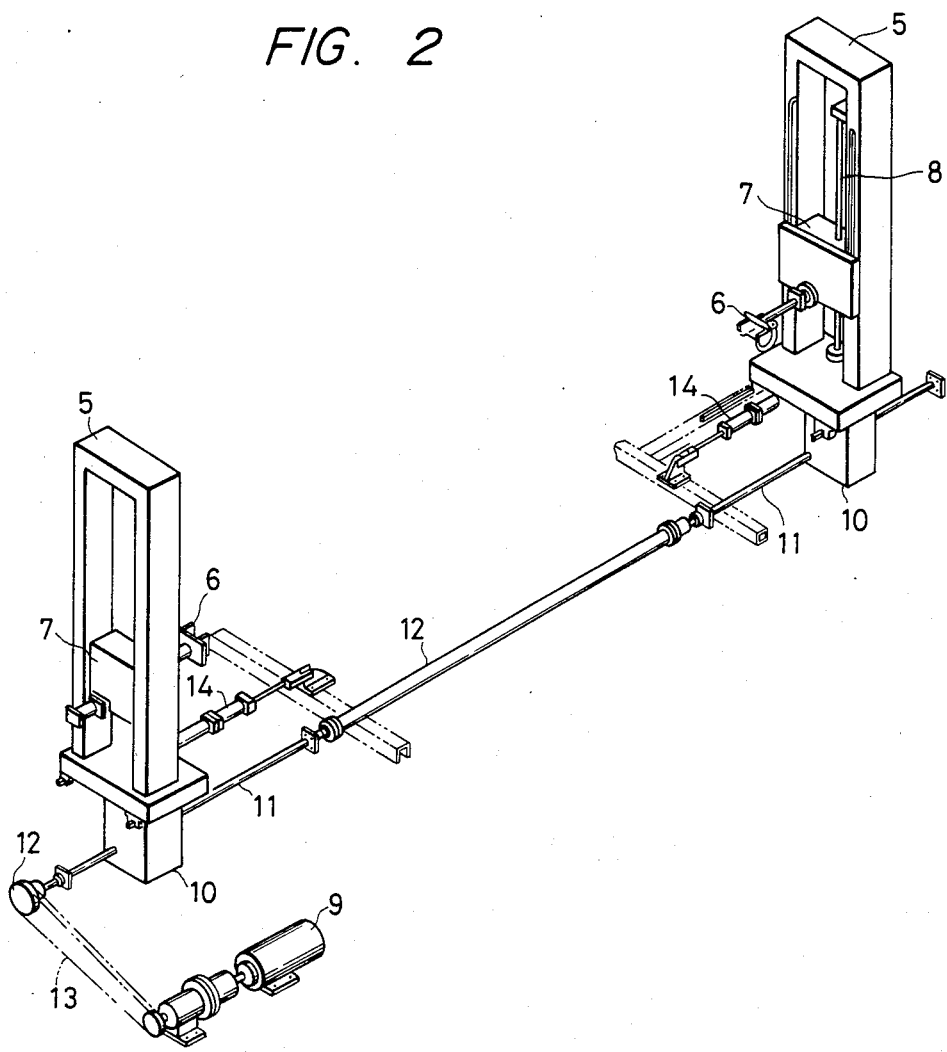
FIG. 2 is a perspective view showing a reversing mechanism.

A reversing mechanism 4 is disposed at the first station 1ST. As shown in FIG. 2, the reversing mechanism is formed by elevatably adapting a rotor unit 7 equipped with reversing jaws 6 to each of a pair of reversing mechanism frames 5 that are erected on the bed 1 in such a manner as to oppose each other. The rotor unit 7 can move up and down due to the rotation of a motor 9 in normal and reverse directions which motor meshes with a ball screw 8 extending vertically inside each reversing mechanism frame 5.

More specifically, the reversing jaw 6 can clamp and unclamp the workpiece W due to the operation of a clamping air cylinder 10 and can be rotated arbitrarily by a motor for rotation incorporated in the rotor unit 7. On the other hand, one of the ends of the ball screw 8 is connected to a gear box 10 which is disposed at a lower part of the reversing mechanism frame 5. The gear box 10 has a built-in power conversion gear such as a worm gear, and two gear boxes 10 are connected to each other by spline shafts 11, 11 and a connecting shaft 12. A pulley 13 is fixed to one of the spline shafts 11, and a timing belt 13 is wound between this pulley 12 and the output shaft of the motor 9. In other words, the rotation driving force of the motor 9 is transmitted to the spline shaft 11 through the timing belt 13 and further through the gear box 10 as synchronous rotation of the ball screw 8. When the ball screw 8 rotates, the rotor unit 7 and hence, the reversing jaws 6, move upward. If the motor for rotation is driven in the interim, the reversing jaws 6 can rotate arbitrarily through the elevation process described above.

Incidentally, the right and left reversing mechanism frames 5 can move in mutually separating and approaching directions by a cylinder 14. Therefore, the workpiece conveyor of the present invention can handle various workpieces by changing suitably their mutual distance without necessity of changing the length of the reversing jaws 6.

On the other hand, a first workpiece receiver 15 is mounted to the second station 2ST. This first workpiece receiver 15 is placed on a lifter 16 which is in turn disposed on the bed 1.

Figure 3:
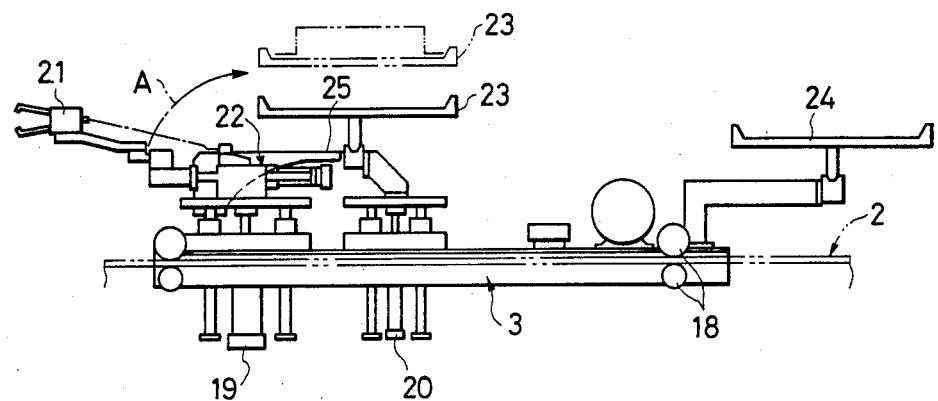
FIG. 3 is a front view showing the components of a carriage.

The carriage 3 moves back and forth on the guide rails 2 through rollers 18 by driving means (not shown) and preferably, by a link-lever mechanism disclosed in the afore-mentioned reference, Japanese Utility Model Laid-Open No. 147636/1973. An unloader lifter 19 and a workpiece receiving lifter 20 are mounted to one of the portions of the carriage 3 as shown in FIG. 3. A clamp unit 22 equipped with an unloader jaw 21 is mounted to the unloader lifter 19 and a second workpiece receiver 23 is mounted further onto the workpiece receiving lifter 20.

The unloader jaw 21 can clamp and unclamp the finished workpiece W inside the press mold, and can move back and forth incrementally by an air cylinder incorporated in the clamp unit 22.

A third workpiece receiver 24 is fitted to the other end portion of the carriage 3. The third workpiece receiver 23 and the second workpiece receiver 22 are spaced apart from each other by exactly the same distance as the pitch between the first station 1ST and the second station 2ST. Presuming that the carriage 3 is at the backward end (i.e. original position) as shown in FIG. 1, the second workpiece receiver 22 and the third workpiece receiver 23 are located at the first station 1ST and at the second station 2SI., respectively.

A pair of right and left leaf cams 25 are mounted to the bed 1 near the first station 1ST, and cam followers 26 are fitted on both sides of the unloader lifter 19 in such a manner as to be capable of meshing with the leaf cams 25. Such restrict the removal or cycle of the workpiece W by the unloader jaws 21. When the carriage 3 is moved forward while advancing the unloader lifter 19, the unloader lifter 19 rises while following a curve in conformity with the R-shaped profile of the lower surface of the leaf cam 25, and the unloader mechanism, too, rises in response thereto while following a curve as represented by an arrow A. Thus, the removal orbit or cycle of the workpiece W can be made smooth.

Figure 4:
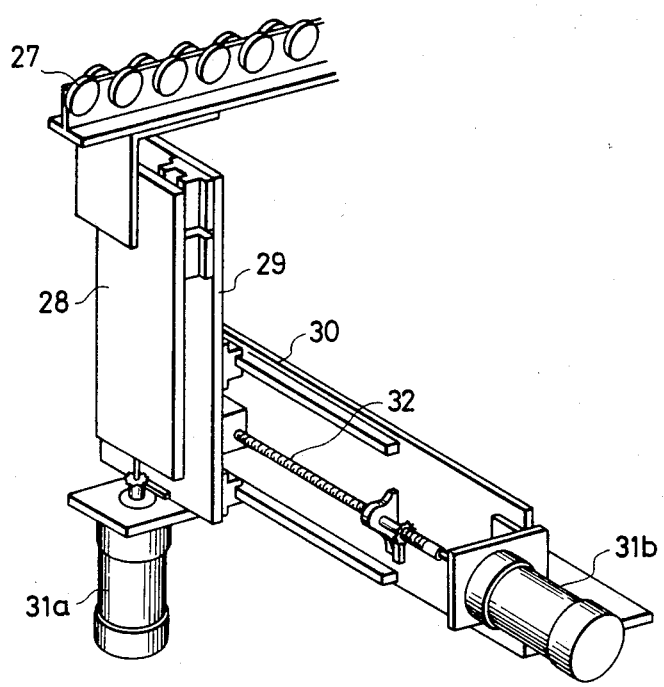
FIG. 4 is a perspective view showing the assembly structure of workpiece receiving rollers.

Two lines of right and left workpiece receiving rollers 27 are disposed at the first station 1ST. These rollers 27 support the lower surface of the workpiece W and guide the workpiece when the unloader jaw 21 charges the workpiece W, that has been clamped by the jaw 21, into the first station 1ST. The rollers have the assembly structure such as shown in FIG. 4, for example. Namely, the workpiece receiving rollers 27 are supported by a base 30 through a vertical slider 28 and a horizontal slider 29. The vertical slider 28 is connected to a regulating motor 31a, which is fixed to the lower end of the horizontal slider 29, and to a regulating motor 31b, which is fixed to one of the end portions of the support base 30, via a screw feed mechanism 32. These sliders can be moved longitudinally and transversely by these regulating motors 31a, 31b. Accordingly, the gap and height of the right and left two lines of workpiece receiving rollers 27 can be regulated arbitrarily, and the conveyor of the present invention can be applied to a variety of workpieces.

Next, the action of the workpiece conveyor which has construction described above will be explained.

First of all, the carriage 3 is located at the backward end portion as shown in FIG. 1 and can remove the workpiece W, which has been press-molded, from the press mold. The unloader jaw 21 is first moved forward by the operation of the air cylinder inside the clamp unit 21 and then clamps the workpiece W. At the same time, the unloader lifter 19 moves upward, and the carriage 3 starts moving forward. Then, the cam followers 26 fitted to the unloader lifter 19 mesh with the leaf cams 25 so that the unloader lifter 19 is guided by the leaf cams 25 and rises upward while following a curve, and the workpiece W is removed from the mold while following a curve, too, and is charged into the first station 1ST while its lower surface is supported by the workpiece receiving rollers 27.

The workpiece W thus charged to the first station 1ST is then clamped by the reversing jaw 6 that has been in a waiting or standby state and at the same time, the unloader jaw 21 moves back and the unclamp lifter 19 moves down, so that the carriage 3 returns to its original position. Then, the ball screw 8 is rotated by the operation of the motor 9 and the rotor unit 7 starts rising in response to the former. The motor for rotation of the rotor unit 7 starts operating at an intermediate timing of this rise and the reversing jaw 6, and hence the workpiece W, start rotating and the workpiece W is rotated by 90° at the end or rise of the rotor unit 7.

Thereafter, the motor 9 rotates reversely and the rotor unit 7 starts moving down. The reversing jaw 6 keeps rotation during this descending step and finally, the workpiece W finishes rotation through 180°. At this time, the motor 9 and the motor for causing rotation stop. Then, the workpiece receiving lifter 20 operates simultaneously upon completion of 180° reverse rotation, the second workpiece receiver 23 rises up and the workpiece W is transferred onto the second workpiece receiver 23 by the unclamping operation of the reversing jaws 6. In the interim, the unloader jaws 21 operate so as to remove the next workpiece on the carriage 3 that has returned to the original position, and when the transfer of the workpiece W to the second workpiece receiver 23 is completed, the unloader lifter 19 rises and the carriage 3 moves forward once again.

As the carriage 3 advances once again, the second workpiece receiver 23 reaches the second station 2ST at the end of advance of the carriage. At this time, the first workpiece receiver 15 rises up due to the operation of the lifter 16 and the workpiece W on the second workpiece receiver 23 is transferred to the first workpiece receiver 15.

Next, the carriage 3 moves back, and the first workpiece receiver 15 move down at the backward end of the carriage 3, so that the workpiece W is transferred to the third workpiece receiver 24 on the carriage 3. Thereafter, the carriage 3 repeats the operations described above and then moves forward. The third workpiece receiver 24 is positioned at the third station 3ST at the end of advance of the carriage 3, and the workpiece W is clamped by the loader (not shown) and is charged to the press of the next step.

Figure 5:
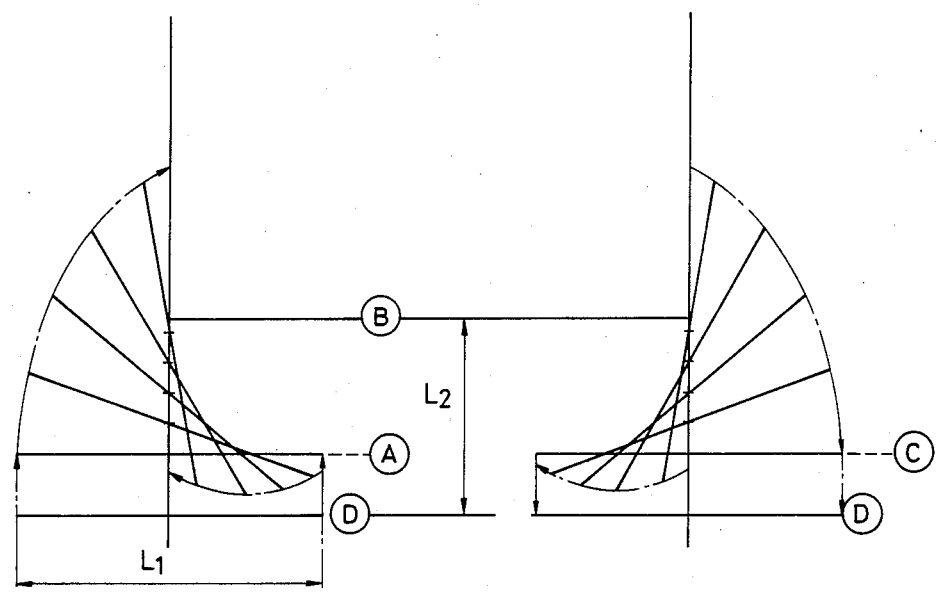
FIGS. 5 and 6 are explanatory view showing the operation state of the reversing mechanism.
Figure 6:
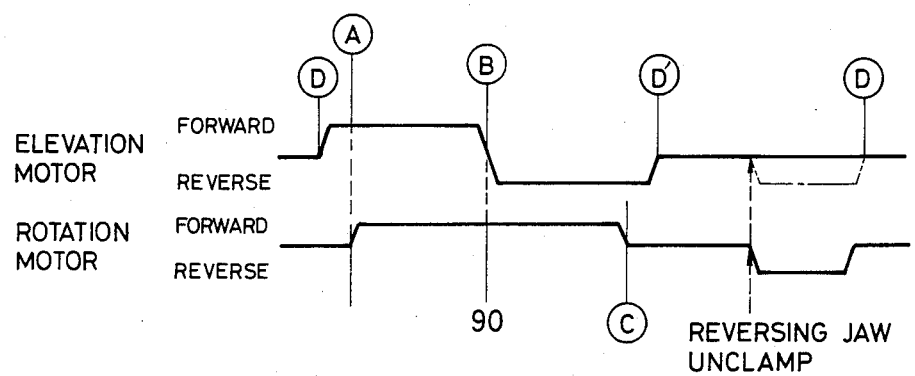

FIGS. 5 and 6 show a series of the operations of the reversing mechanism 4 described above. When the reversing mechanism 4 receives a starting instruction, the motor 9 for causing elevation is first actuated, generates a rotation instruction at a point (A) midway of its rise and then keeps rising. Upon receiving the rotation instruction, the motor for causing rotation starts rotating and the motor 9 for causing elevation stops at the end of rising (B). At this time, the motor for rotation has rotated by 90°. Thereafter, the motor 9 for elevation immediately rotates in the reverse direction and the reversing mechanism 4 starts moving down. The motor for rotation continues its rotation as such and has finished its rotation by 180° at a point (C). It further moves down until point (D') is reached. After the unclamping operation by the reversing jaw 6 is confirmed, the motor 9 for elevation and the motor for rotation starts rotating once again and the unloader jaw 6 returns to its original position. In FIG. 5, $L_1$ represents the width of the workpiece and $L_2$ represents a rising stroke.

In the manner described above, reversion of the workpiece W and its feed at a constant pitch become possible. Moreover, since the carriage 3 is provided with the unloader function and the reversing mechanism is disposed at the first station 1ST, the workpiece conveyor of this invention can be applied to existing presses having a small gap between them. Furthermore, since removal and replacing of the workpiece can be made smoothly, the strain that will otherwise occurs in the workpiece can be limited. Since the two workpiece receivers on the carriage 3 are driven independently of each other, the workpiece can be transferred efficiently.

Although the foregoing description deals with the case where the workpiece W is subjected to reversion and transfer, the workpiece W can be transferred without reversion by not permitting the motor for rotation inside the rotor unit 7 in the reversing mechanism 4 to rotate.

The means for regulating the mutual distance between the frames 5 of the reversing mechanism is not particularly limited to the cylinder 14 used in the embodiment described above, and other means such as screw feed means can of course be used. The longitudinal and transverse regulation mechanisms of the workpiece receiving rollers 27 are not particularly limited to the combination of the motors 31a, 31b with the screw feed mechanism 32, and other means such as cylinders can of course be used. Furthermore, the driving mechanism of the ball screw 8 is not particularly limited to one that is used in the embodiment, and various other driving mechanisms can of course be used.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A workpiece conveyor, comprising:
   first, second and third stations disposed in such a manner as to lie between a press of a preceding step and a press of a next step;
   a carriage adapted for moving between said first, second and third stations;
   first workpiece receiver means disposed at said second station and adapted for moving up and down;
   an unloader lifter;
   workpiece receiving lifter means disposed adjacent said unloader lifter at one end portion of said carriage;
   an unloader mechanism disposed on said unloader lifter;
   second workpiece receiver means disposed on said workpiece receiving lifter;
   third workpiece receiver means disposed at a second end of said carriage spaced apart from said second workpiece receiver means by a same distance as a distance between each of said stations; and
   leaf cam means disposed adjacent said first station for meshing with said unloader lifter and removing said workpiece along a curved path.

2. The workpiece conveyor as defined in claim 1, further comprising a reversing mechanism which includes a pair of right and left reversing jaws driven separately for elevation and rotation, said reversing mechanism being disposed at said first station, a plurality of rotor units and a plurality of reversing mechanism frames for supporting said reversing jaws through said rotor units, respectively, and wherein a distance between said reversing mechanism frames is variable.

3. The workpiece conveyor as defined in claim 1, further comprising two lines of workpiece receiver rollers disposed in said first station on said support base wherein the position thereof is regulated vertical and horizontally by a vertical slider and a horizontal slider, respectively.

* * * * *